United States Patent
Kaiya et al.

[11] Patent Number: 5,209,847
[45] Date of Patent: May 11, 1993

[54] ULTRATHIN MEMBRANE OF POLYMETHACRYLATE OR POLYCROTONATE AND DEVICE PROVIDED WITH ULTRATHIN MEMBRANE

[75] Inventors: Norihiro Kaiya; Naoyuki Amaya; Yoshishige Murata, all of Tsukuba; Mikio Takagi, Okazaki; Kazuichi Tsuda, Nagoya; Kiyotaka Shigehara, Tokyo; Akira Yamada, Kamifukuoka; Takayuki Otsu, Nara, all of Japan

[73] Assignees: Nippon Oil and Fats Co., Ltd., Tokyo, Japan; Rikagaku Kenkyusho, Saitama, Japan

[21] Appl. No.: 590,908

[22] Filed: Oct. 1, 1990

[30] Foreign Application Priority Data

| | | | |
|---|---|---|---|
| Oct. 3, 1989 | [JP] | Japan | 1-257104 |
| Oct. 3, 1989 | [JP] | Japan | 1-257105 |
| Oct. 3, 1989 | [JP] | Japan | 1-257106 |
| Nov. 15, 1989 | [JP] | Japan | 1-295121 |
| Nov. 15, 1989 | [JP] | Japan | 1-295122 |
| Nov. 15, 1989 | [JP] | Japan | 1-295123 |

[51] Int. Cl.⁵ ............................. B01D 67/00
[52] U.S. Cl. ..................... 210/490; 204/290 F; 210/500.28
[58] Field of Search ............ 210/490, 500.28; 427/43.1, 245; 264/298, 308; 351/160 H; 204/290 F, 296

[56] References Cited

U.S. PATENT DOCUMENTS

| | | | |
|---|---|---|---|
| 4,208,211 | 6/1980 | Bowden et al. | 427/43.1 X |
| 4,275,183 | 6/1981 | Kuzma | 351/160 HX |
| 4,554,076 | 11/1985 | Speaker | 210/500.28 X |

*Primary Examiner*—Frank Spear
*Attorney, Agent, or Firm*—Jordan and Hamburg

[57] ABSTRACT

An ultrathin polymeric membrane has a membrane thickness of 10 to 1,000 Å. The membrane is constituted of polycarboxylate and obtained by the spin coating method or by the Langmuir-Blodgett method. The polycarboxylate contains recurrent units represented by the formula (I)

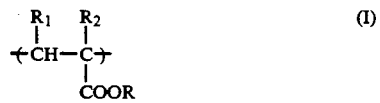

wherein $R_1$ and $R_2$ represent different groups and each stands for a methyl group or a hydrogen atom, and R represents a hydrocarbon group selected from the group consisting of a branched alkyl group having 3 to 12 carbon atoms, a cycloalkyl group having 3 to 12 carbon atoms, a substituted alkyl group having 2 to 6 carbon atoms, a substituted cycloalkyl group having 3 to 10 carbon atoms and a siloxanic hydrocarbon group.

17 Claims, 6 Drawing Sheets

ULTRATHIN MEMBRANE OF POLYMETHACRYLATE OR POLYCROTONATE AND DEVICE PROVIDED WITH ULTRATHIN MEMBRANE

BACKGROUND OF THE INVENTION

This invention relates to a polymethacrylate or polycrotonate ultrathin membrane, a method for producing the membrane and an electrical device or element provided with such a membrane.

An ultrathin polymeric membrane used heretofore in electrical or optical devices or for patterning is a smooth and homogeneous thin film having uniform molecular orientation. One of the methods for producing such an ultrathin polymeric membrane is the Langmuir-Blodgett method, referred to hereinafter as the LB method. The LB method resides in forming a dilute solution of organic molecules in an organic solvent, developing the solution on a clean water surface, and compressing a gaseous membrane remaining after vaporization of the solvent in the horizontal direction to form a solid membrane having molecules packed tightly together, and transferring and stacking the membrane in plural layers on the surface of a solid substrate. The thin membrane thus formed on the substrate is called the LB membrane, see for example the literature by K. B. Blodgett, J. Am. Chem. Soc., 55, 1007 (1935) and K. Fukuda et al, J. Colloid Interface Sci. 54,430 (1976). A feature of the LB membrane is that membranes within a range of thicknesses from an ultrathin membrane of the order of a molecule to a stacked membrane of a desired thickness, i.e. a multilayered membrane may be produced and that the membrane is smooth and homogeneous with uniform molecular orientation. Thus, the LB membranes are expected to be used for a variety of electronic materials and formation of LB membranes of straight-chain fatty acids having not less than 16 carbon atoms, or alkaline earth metal or cadmium salts thereof, has been considered extensively, see for example "Bunshi Syugotai" by K. Fukuda and H. Nakahara in "Kagaku Sousetu 40" pages 80 to 104, 1983 and literatures cited therein. However, these LB membranes of fatty acids and metal salts thereof are low in mechanical strength or thermal resistance and hence cannot be put to practical applications. Accordingly, it has been suggested to form polymerizable fatty acid into an LB membrane prior to polymerization or to polymerize on the water surface followed by formation of an LB membrane, see for example the above literatures. However, with these polymerization methods, the membrane is frequently constricted or cracked during polymerization, while it is extremely difficult to transfer the membrane onto the substrate surface.

Although it is possible to form an LB membrane of a polymer material and to transfer and stack the LB membrane on the substrate, a polymer material in general is in the state of intricately entangled strands, even in a dilute solution, so that a gaseous membrane is not formed when the polymer material is spread on the water surface, with resulting difficulties in the formation of LB membranes. The polymer chain takes the form of a rod-like structure to form an LB membrane in exceptional cases wherein polypeptide or polyitaconate is used, as reported by J. H. McAlear et al, Symposium on VLSI Technology, Digest of Tech. Paper,82 (1981), K. Shigehara et al, J. Amer. Chem. Soc., 1237, Vol. 109, (1987).

It has also been tried to provide a solution of synthetic polymer material on the substrate by spin coating for forming an insulating layer on a variety of devices. However, the properties required of the insulating layer include thermal resistance of at least 200° C., thermal and chemical stability, moisture proofness and excellent mechanical and electrical properties. There are only a limited number of polymer materials which were known to have these properties, such as, for example, polyimide, polyether sulfone, polyphenylene sulfide, polysulfone, polyphenylene oxide or polyethylene terephthalate. These polymer materials are dissolved in an organic solvent to form a dilute solution which is then spin coated on a substrate prior to vaporization of the solvent to form an insulating layer. As the solvent for polyimide or polysulfone, dimethylacetoamide or N-methyl pyrrolidone is employed. However, these solvents have high boiling points and are polar solvents, so that they are low in vaporization speed and tend to remain in the insulating membrane. In addition, since the polymer solution has high viscosity, technique of higher level is required to form a smooth homogeneous membrane.

On the other hand, in the field of image display, various developments have recently been made in the display method by liquid crystals since the display with a quicker response may be made with lower power consumption and a display from a small area to a larger area is also feasible. The critical point in the preparation of the liquid crystal device is how to array the liquid crystal molecules in an orderly manner. To this end, it is critical to provide the liquid crystal substrate with proper orientation characteristics, and a variety of processing methods have been known to date for achieving such orientation characteristics.

As the processing methods for providing orientation characteristics, there are known the methods of solution coating, plasma processing, rubbing, vacuum evaporation and lift coating, as disclosed in "Recent Technology of Liquid Crystals—Physical Properties, Material and Application" by S. Matsumoto and I. Tsunoda. Most common place among the above methods is the rubbing method, in which the substrate itself is rubbed in a predetermined direction by cloth or leather, or a skin layer of an organic or inorganic material is formed on the substrate surface and rubbed for orientation processing. By such orientation, the liquid crystals are oriented in a direction parallel to the rubbing direction. This method is currently used on the production site of liquid crystal cells In general, a polyimide resin is coated on a substrate for a liquid crystal and the so-formed skin layer is rubbed to control the orientation of the liquid crystal molecules.

Currently, a higher contrast and a quicker response are required of the liquid crystal display device. To this end, it is necessary to reduce the thickness of the orientation membrane itself to the order of Angstroms. It is also necessary to control the orientation more precisely. Although a polyimide resin, a liquid crystal material known to date, is superior in thermal resistance, mechanical strength and liquid crystal orientation characteristics, it needs to be applied by spin coating, roll coating, immersion coating, spray coating or gravure coating, in order to reduce the membrane thickness to as small a value as possible to produce the orientation membrane. However, the solvent used for dissolving the polyimide resin is polar and, in addition, it has a high boiling point, so that it is difficult to prepare the thin membrane by coating.

Therefore, with the current method of coating or spin coating the polyimide resin and rubbing the coated layer to form the orientation membrane, it is difficult to reduce the membrane thickness further and to produce a homogeneous and impeccable membrane, such that orientation cannot be controlled in a desired manner by the rubbing method.

It has also been proposed to stack or deposit monomolecular solid membranes in plural layers on a liquid crystal substrate by the LB method, as disclosed in the Japanese Unexamined Patent Publication No.274451/1988. However, the low molecular polymer LB membranes cannot be used practically since they are insufficient in miscibility with liquid crystal or in chemical, thermal and mechanical resistances, whereas the polymerizable LB membrane is subject to constrictions or membranous defects due to contraction caused during polymerization.

On the other hand, electrical devices such as varistors, thyristors, diodes, photodiodes, light emitting diodes, transistors or LSIs composed of integrated circuits formed by these electrical devices, may basically be classified into MIM (metal/insulator/metal) device, MIS (metal/insulator/semiconductor) device, MS (metal/semiconductor) device or Scottkey element and SIS (semiconductor/insulator/semiconductor) device. Among these, for MIM, MIS and SIS devices which are in need of the insulating layers, referred to hereinafter as the I layers, a method has been proposed which consists in thinly oxidizing a substrate of aluminum or beryllium or a silicon surface to form a metal oxide and/or an $SiO_2$ insulating layer and forming a counter electrode. However, this method cannot be applied to substrates of metals and/or semiconductors other than those mentioned above and, when above all the semiconductors other than Si, inclusive of the compound semiconductors, are used, the method cannot be applied to MIS type devices which may be applied extensively to, for example, diodes, photodiodes, light emitting diodes, field effect transistors or thin film transistors. Therefore, if the insulating thin membrane of an organic compound is used as a sole layer, the totality of the combinations are enabled. The insulating thin membrane used for this purpose is required to be smooth and homogeneous while being 20 to 1,000 Å in thickness.

On the other hand, while the LB membrane produced by the LB method is thought to be promising as the material for electronics, as mentioned hereinabove, it is only poor in mechanical strength and thermal resistance and hence cannot be used practically. Moreover, it is subject to constriction or cracking at the time of polymerization, while it is extremely difficult to transfer the membrane onto the substrate.

In general, a soft linear polymer material is in the aggregated state presenting intricately entangled strands in any dilute solution, and cannot be formed into a gaseous membrane when evolved on water surface so that it is unfit to be formed into an LB membrane. As an exception, an LB membrane of polypeptide has been reported, as mentioned above. However, this membrane may be dissolved only in a specific multicomponent solvent, such as chloroform/trichloroacetic acid/methanol, while trichloroacetic acid, which is an indispensable ingredient for maintaining solubility, tends to deteriorate the surface of a metal used as a substrate.

SUMMARY OF THE INVENTION

It is a principal object of the present invention to provide an ultrathin polymeric membrane which is superior in mechanical strength, chemical stability and thermal resistance, and a method for preparing the membrane.

It is another object of the present invention to provide a liquid crystal membrane which may be formed into an ultrathin membrane and which is superior in liquid crystal orientation characteristics, mechanical strength, chemical stability and thermal resistance.

It is a further object of the present invention to provide an electrical device provided with a polymer insulating layer which is superior in mechanical strength, thermal stability, transparency and insulating properties and exhibiting molecular orientation characteristics.

The above and other objects of the present invention will become apparent from the following description.

In accordance with the present invention, there is provided an ultrathin polymeric membrane having a membrane thickness of 10 to 1,000 Å, the membrane being constituted of polycarboxylate and obtained by the spin coating method, the polycarboxylate comprising recurrent units represented by the formula (I)

wherein $R_1$ and $R_2$ represent different groups and each stands for a methyl group or a hydrogen atom, and R represents a hydrocarbon group selected from the group consisting of a branched alkyl group having 3 to 12 carbon atoms, a cycloalkyl group having 3 to 12 carbon atoms, a substituted alkyl group having 2 to 6 carbon atoms and containing a ring structure substituent having 3 to 14 carbon atoms, a substituted cycloalkyl group having 3 to 10 carbon atoms and containing a ring structure substituent having 3 to 14 carbon atoms and a siloxanic hydrocarbon group containing a ring structure substituent having 3 to 14 carbon atoms with or without each of the hydrocarbon groups containing a hetero atom and being substituted by a halogen atom.

In accordance with the present invention, there is also provided an ultrathin polymeric membrane having a membrane thickness of 10 to 1,000 Å, the membrane being constituted of polycarboxylate and obtained by the Langmuir-Blodgett method, the polycarboxylate comprising recurrent units represented by the above formula (I).

In accordance with the present invention, there is also provided a method for producing the ultrathin polymeric membrane obtained by the spin coating method, comprising dissolving polycarboxylate of the formula (I) in a vaporizable organic solvent to prepare a solution of the polycarboxylate with a concentration of 0.1 to 20 mg/ml and forming a thin membrane by the spin coating method at 1,000 to 15,000 rpm.

According to the present invention, there is also provided a method for producing the ultrathin polymeric membrane obtained by the Langmuir-Blodgett method, comprising dissolving the polycarboxylate of the formula (I) in a vaporizable organic solvent to prepare a solution of the polycarboxylate with a concentration of 0.1 to 10 mg/ml, developing the solution on a water surface, applying a pressure to the developed solution, maintaining the surface pressure at 3 to 30 mN/m to form a solid membrane and stacking a plurality of the solid membranes by the vartical dipping method or by the horizontal lifting method.

In accordance with the present invention, there is also provided a liquid crystal orientation membrane obtained by rubbing and orienting the ultrathin polymeric membrane formed by the spin coating method on a substrate.

In accordance with the present invention, there is provided a liquid crystal orientation membrane obtained by stacking the ultrathin polymeric membrane obtained by the Langmuir-Blodgett method on a substrate.

In accordance with the present invention, there is also provided an electrical device comprising an electrode and an insulating layer including the ultrathin polymeric membrane obtained by using the spin coating method or the Langmuir-Blodgett method.

PREFERRED EMBODIMENTS OF THE INVENTION

The present invention will be explained in more detail hereinbelow.

The polycarboxylate employed for preparing the ultrathin polymeric membrane of the present invention may be represented by the following formula (I)

wherein $R_1$ and $R_2$ represent different groups and each stands for a methyl group or a hydrogen atom; and R represents a hydrocarbon group selected from the group consisting of a branched alkyl group having 3 to 12 carbon atoms, a cycloalkyl group having 3 to 12 carbon atoms, a substituted alkyl group having 2 to 6 carbon atoms and containing a ring structure substituent having 3 to 14 carbon atoms, a substituted cycloalkyl group having 3 to 10 carbon atoms and containing a ring structure substituent having 3 to 14 carbon atoms and a siloxanic hydrocarbon group containing a ring structure substituent having 3 to 14 carbon atoms with or without each of the hydrocarbon groups containing a hetero atom such as a nitrogen atom, an oxygen atom, a phosphorus atom or a sulfur atom and being substituted by a halogen atom such as a chlorine atom, fluorine atom or an iodine atom.

The polycarboxylate having the recurrent units represented by the formula (I) may preferably include homopolymers or copolymers of methacrylic esters having hydrocarbon residues, such as isopropyl methacrylate, tert-butyl methacrylate, cyclohexyl methacrylate, adamantyl methacrylate or 4-methyl-2-pentyl methacrylate; methacrylic esters having siloxanic hydrocarbon residues, such as (trimethylsilyl) methacrylate, 3-tris(trimethylsiloxy)-silylpropyl methacrylate or 3-((pentamethyl)disiloxanyl)-propyl methacrylate; methacrylic esters containing hetero atoms, such as N,N-dimethylaminoethyl methacrylate, 1-butoxy-2-propyl methacrylate, 2-cyanoethyl methacrylate, glycidyl methacrylate, diethylphosphonomethyl methacrylate or 2-methylthioethyl methacrylate; halogen-substituted methacrylic esters, such as perfluorooctylethyl methacrylate, trifluoromethyl methacrylate, pentafluoroethyl methacrylate, hexafluoroisopropyl methacrylate or 1-chloroisopropyl methacrylate; crotonic acid esters containing hydrocarbon residues, such as isopropyl crotonate, tert-butyl crotonate, cyclohexyl crotonate, sec-butyl crotonate, or 4-methyl-2-pentyl crotonate; crotonic acid esters containing siloxanic hydrocarbons, such as (trimethylsilyl) crotonate or 3-tris(trimethylsiloxy) silylpropyl crotonate; crotonic acid esters containing hetero atoms, such as 2-cyanoethyl crotonate, glycidyl crotonate, diethylphosphonomethyl crotonate, 1-butoxy-2-propyl crotonate or 2-methylthioethyl crotonate; halogen-substituted crotonic acid esters, such as perfluorooctylethyl crotonate, trifluoromethyl crotonate, pentafluoroethyl crotonate, hexafluoroisopropyl crotonate or 1-chloroisopropyl crotonate; and polymethacrylate or polycrotonate obtained by copolymerization with various copolymerizable monomers.

The polycarboxylates having recurrent units represented by the formula (I), such as methacrylic ester polymer of the above formula (I) wherein $R_1$ is a hydrogen atom and $R_2$ is a methyl group, may be prepared by polymerization or copolymerization using conventional radical polymerization methods. Although there is no limitation to the reaction conditions for polymerization or copolymerization, the reaction is preferably carried out at a temperature of 0 to 100° C. and for a time period of 2 to 30 hours. Agents employed for initiating the polymerization or copolymerization include benzoyl peroxide, diisopropyl peroxycarbonate, tert-butylperoxy-2-ethylhexanoate, tert-butylperoxy pivalate, tert-butylperoxydiisobutylate, lauroyl peroxide and azobisisobutyronitrile. The polymerization initiators may be preferably employed in an amount of not more than 10 parts by weight and more preferably in an amount of not more than 5 parts by weight to 100 parts by weight of the feed monomer.

The crotonic acid ester polymers having the formula (I) in which $R_1$ is a methyl group and $R_2$ is a hydrogen atom, may be prepared by polymerization or copolymerization using conventional anionic polymerization methods. Although there is no limitation to the reaction conditions for polymerization or copolymerization, the reaction is preferably carried out at a temperature of $-100°$ to $100°$ C. and for a reaction time period of 2 to 30 hours. Agents for initiating the polymerization or copolymerization include n-butyl lithium, n-amyl sodium, n-octyl potassium, naphthalene sodium, anthracene sodium, phenyl magnesium bromide, sec-butyl magnesium chloride and triethyl aluminum. The polymerization initiators may be preferably employed in an amount of not more than 10 parts by weight and more preferably in an amount of not more than 5 parts by weight to 100 parts by weight of the feed monomer.

The aforementioned polycarboxylate preferably has an average molecular weight in the range of from 10,000 to 2,000,000. Comonomers copolymerizable with methacrylate or crotonate, that is comonomers having recurrent units that may be used as recurrent units constituting the polycarboxylate, may be enumerated by, for example, vinyl acetate, vinyl propionate, vinyl caproate, vinyl benzoate, styrene, α-methylstyrene, chloromethylstyrene, methylvinylether, n-butylether, aliphatic or aromatic allyl esters, acrylic or methacrylic esters, acrylonitrile, vinyl chloride, vinylidene chloride, ethylene, butadiene, chloroprene, isoprene and isobutylene.

It is preferred that the polycarboxylate employed in the present invention contains not less than 60 mol percent of the recurrent units of methacrylate or crotonate represented by the formula (I). The content of the methacrylate or crotonate recurrent units of less than 60 mol percent is not desirable since then the rigid rod-like structure proper to the polymer cannot be maintained and the state of entangled strands is presented in a polymer solution, so that it becomes difficult to produce a uniform thin membrane by the spin coating or LB methods, while chemical and thermal state of the membrane tends to become unstable. On the other hand, it becomes difficult to prepare the thin membrane itself, while the uniformity of the membrane is undesirably lowered.

According to the present invention, the ultrathin membrane may be prepared by the spin coating method, that is by spin coating a solution containing a predetermined amount of polymethacrylate or polycrotonate within a predetermined range of the numbers of revolutions. More specifically, the aforementioned polymethacrylate or polycrotonate is dissolved in a vaporizable organic solvent to prepare a dilute solution. The vaporizable organic solvents may include general solvents, such as, for example, chloroform, ethylene dichloride, benzene, toluene or 1,1,2-trichloro-1,2,2-trifluoroethane. It is necessary that the polymethacrylate or the polycrotonate be a solution containing 0.1 to 20 mg/ml of polymethacrylate or polycrotonate. The solution may be prepared by adjusting the concentration of the solution to preferably 0.5 to 3 mg/ml. For preparing the ultrathin membrane having a thickness of 10 to 1,000 Å from the solution by the spin coating method, it is preferred that the number of revolutions of the spin coater be in the range of from 1,000 to 15,000. Although the membrane thickness may be changed slightly with the operating temperature, the desired ultrathin polymeric membrane may be prepared by spin coating at the operating temperatures of from 10° to 35° C., if the operation is carried out under the aforementioned conditions.

According to the present invention, the ultrathin membrane may also be prepared by the LB method by developing a solution containing a predetermined amount of polymethacrylate or crotonate on the water surface, maintaining the surface pressure at a predetermined pressure to form a solid membrane and stacking the solid membrane by the vertical dipping method or by the horizontal lifting method. More specifically, polymethacrylate or polycrotonate is dissolved in a vaporizable organic solvent to produce a dilute solution, which is then developed on a clean water surface to form a gaseous membrane. The vaporizable organic solvents may be enumerated by general organic solvents, such as chloroform, ethylene dichloride, benzene, toluene or 1,1,2-trichloro-1,2,2-trifluoroethane. The dilute solution in any of these organic solvents is quietly developed on the water surface. In developing the solution on the water surface, care should be exercised as to the concentration of the solution and the type of the solvents. The concentration of the developed solution is in the range of from 0.1 to 10 mg/ml and preferably in the range of from 0.1 to 3 mg/ml. If the solution is developed and the solvent vaporized, there is produced a gaseous membrane at a surface pressure of not more than 1 mN/m at which any interaction among the individual molecules is inhibited. A pressure is applied to the so-formed gaseous membrane from the horizontal direction, for example, to establish the state of a solid membrane, while the surface pressure of 3 to 30 mN/m is maintained. The particular value of the surface pressure depends on the types of the polymers employed. It is preferred to find a surface pressure to area (FA) isothermal curve in advance and to set the surface pressure at an acutely rising portion of the FA curve corresponding to the solid membrane. The ultrathin polymeric membrane may then be produced by stacking a plurality of the produced solid membranes on a substrate by the vertical dipping or horizontal lifting methods.

The liquid crystal orientation membrane of the present invention is an ultrathin membrane which is provided with orientation characteristics and which may be obtained by rubbing treatment of the ultrathin polymeric membrane obtained by the spin coating or LB methods. That is, when the liquid crystal orientation membrane of the present invention is prepared by the spin coating method, an ultrathin polymeric membrane is formed on a liquid crystal substrate by a method similar to that used for preparing the ultrathin polymeric membrane by the spin coating method. When the liquid crystal orientation membrane is prepared by the LB method, an ultrathin polymeric membrane is formed on the liquid crystal substrate by a method similar to that used for preparing the ultrathin polymeric membrane by the LB method. The so-formed ultrathin polymeric membrane is then rubbed by cotton cloth or gauze in a predetermined direction to produce a liquid crystal orientation membrane of the present invention.

A variety of commonly employed substrates may be used as the liquid crystal substrate on which the ultrathin polymeric membrane according to the present invention is formed. For preparing a liquid crystal display cell, a transparent electrically conductive substrate needs to be employed, so that a substrate formed of usual glass which is rendered electrically conductive, such as indium-tin oxide (ITO) glass substrate or tin oxide (NESA) glass substrate, is employed. Although a substrate formed of a variety of transparent resins rendered electrically conductive may be employed, electrically conductive glass substrates are most preferred in view of surface smoothness and resistance to scratching.

The electrical elements or devices according to the present invention mean those elements or devices having a metal/insulator/metal (MIM) structure, a metal/insulator/semiconductor (MIS) structure or a semiconductor/insulator/semiconductor (SIS) structure, in which one of the metals or semiconductors denote the substrate and the other the electrode.

The electrical element or device of the present invention is an element or device having an insulator layer inclusive of the aforementioned ultrathin polymeric membrane and an electrode. That is, when the electrical device of the present invention is prepared by the spin coating method, an ultrathin polymeric membrane is formed on a substrate by a method similar to that used for preparing the ultrathin polymeric membrane by the spin coating method. When the electrical device is prepared by the LB method, the ultrathin polymeric membrane is formed on the substrate by a method similar to that used for preparing the ultrathin polymeric membrane by the LB method. The electrode is finally formed on the so-formed insulating layer to form the electrical device.

Although the homogeneity and smoothness of the insulating layer of the electrical device of the present invention is influenced by the state of the substrate surface, it is sufficient if the substrate presents a mirror surface on which traces produced by grinding may not be observed upon visual observation.

Among the substrate materials which may be most useful as a substrate for electrical devices and on which the aforementioned insulating layer may be formed easily, there are metals such as Al, Si, Ge, Ni, Fe, Co, Cu, Pt or Au; metal oxides or metal oxide semiconductors, such as $SiO_2$, NiO, $SnO_2$, $In_2O_3$ or ITO glass; compound semiconductors, such as galium arsenic, galium phosphorus or indium phosphorus; chalcogens; selenides or sulfides of transition metals, such as zinc selenide or zinc sulfide, $WO_3$ chalcogenides, $VO_2$ chalcogenides, polycarbonates, polyethylene terephthalate, polyethylene or polypropylene. However, other suitable semiconductive or electrically conductive materials may also be employed.

According to the present invention, the desired electrical device may be obtained by forming a conductive or semiconductive electrode on the insulating layer on the substrate by suitable methods, such as vacuum evaporation, high frequency sputtering, ion bean sputtering or molecular beam epitaxy.

As essential conditions of the present invention, the ultrathin polymeric membrane is formed of polycarboxylate of the formula (I), and prepared by the spin coating method or by the Langmuir-Blodgett method. It exhibits chemical stability, insulating properties and mechanical strength, and may be applied to a variety of electrical devices, such as MIM, MIS, SIS or TFT devices, patterning of liquid crystal substrates by rubbing treatment or microlithography or to optical elements or device, such as light guide wave paths or as binder resins for non-linear third order devices.

The liquid crystal orientation membrane of the present invention is comprised of the aforementioned ultrathin polymeric membrane so that it has a smooth membranous surface free of membranous defects such as pinholes. Moreover, it has a high degree of orientation characteristics due to rubbing, or is formed by stacking the membranes on the substrate, so that the liquid crystal may be oriented to a higher degree and hence may be highly useful as a variety of liquid crystal display elements.

In addition, the electrical device of the present invention makes use of the insulating layer comprised of the aforementioned ultrathin polymeric membrane which is excellent in mechanical strength, thermal resistance, weatherability, transparency, insulating properties and resistance to moisture, so that it may be employed in electrical devices formed of metal or semiconductor materials.

EXAMPLES OF THE INVENTION

The present invention will be explained in more detail with reference to the Examples. It is to be noted that these Examples are given by way of illustration only and are not given for limiting the scope of the invention.

EXAMPLE 1-1

Figure 1:
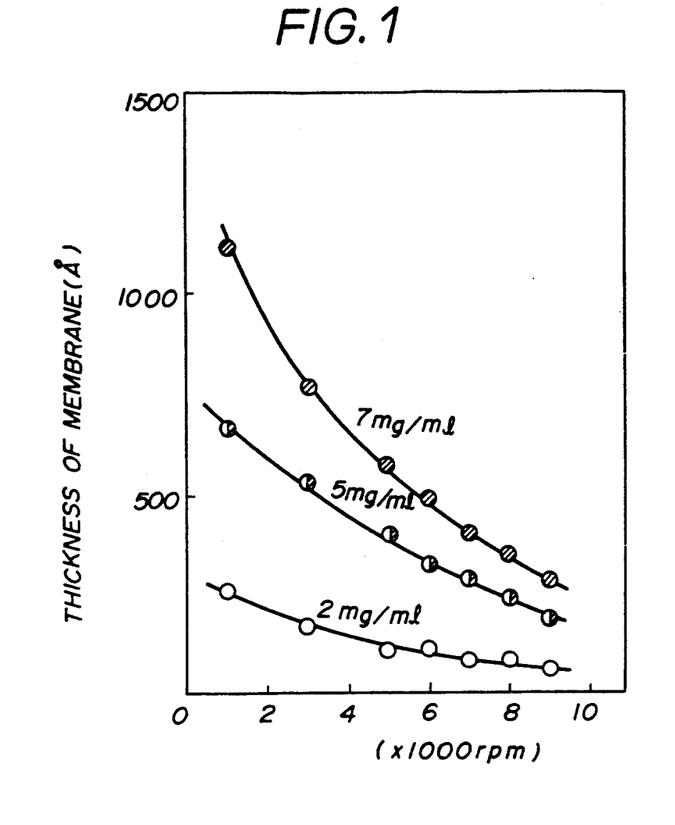
FIG. 1 shows the relation between the number of revolutions of the spin coater employed in Example 1-1 and the membrane thickness of the ultrathin membrane of poly(tert-butyl crotonate).

1 ml of a solution in chloroform of poly(tert-butyl crotonate), hereinafter referred to as PtBCA, with various concentrations, was applied dropwise on a 2.5×5 $cm^2$ size glass substrate, and an ultrathin membrane was prepared by spin coating for a time period of rotation of 80 seconds. The membrane thickness was found by a tracer method (Sloan, Dec-Tac 11A). The relation between the membrane thickness and the number of revolutions is shown in FIG. 1.

EXAMPLES 1-2 TO 1-5

Using poly(cyclohexyl crotonate) (Example 1-2), poly(sec-butyl crotonate) (Example 1-3), poly(hexafluoroisopropyl crotonate) (Example 1-4) and poly(adamantyl crotonate) (Example 1-5) in place of PtBCA of Example 1-1, ultrathin membranes were prepared on the glass substrates under the conditions shown in Table 1-1. The relation between the conditions for preparing the ultrathin membranes and the membrane thicknesses is shown in Table 1-1.

TABLE 1-1

| Ex. | Solvents for Polymer | Polymer Conc. (mg/ml) | Number of Revolution (rpm) | Membrane Thickness (Å) |
|---|---|---|---|---|
| 1-2 | Chloroform | 2.5 | 4000 | 220 |
| 1-3 | Chloroform | 1.5 | 4500 | 120 |
| 1-4 | 3S* | 3.0 | 4500 | 180 |
| 1-5 | Methylene Chloride | 2.5 | 5500 | 140 |

3S* 1,1,2-trichloro-1,2,2-trifluoroethane

EXAMPLE 1-6

Figure 2:
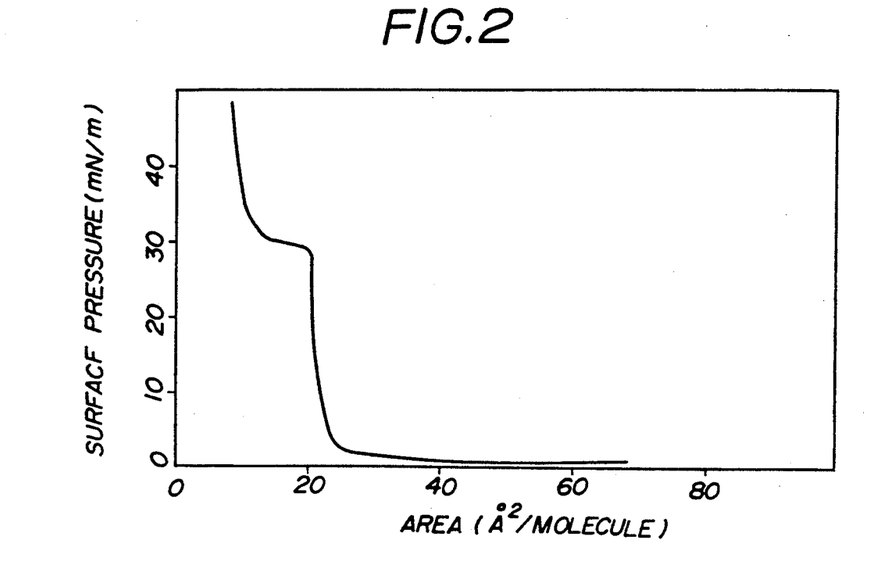
FIG. 2 shows a surface pressure-area curve at 20° C. of poly(isopropyl crotonate) obtained in Example 1-6.

A Teflon trough having an inside dimension of 15×50 $cm^2$ and a depth of 2 cm was filled with pure, water and the room temperature was set to 20° C. 50 μl of a solution in chloroform of poly(isopropyl crotonate), abbreviated hereinafter to PiPCA, with a concentration of 0.5 mg/ml, was applied quietly onto the water surface, and the solvent was vaporized off. While the surface pressure was detected continuously, a Teflon barrier, 20 cm long, placed on the trough, was moved by translational movement at a speed of 5 mm/min to reduce the area to find the relation between the surface pressure and the area occupied by the repeating units (FA curve). FIG. 2 shows the FA curve of PiPCA. It can be seen from this curve that the surface pressure of 5 to 30 mN/m showing an acute rise is suited for stacking the LB membrane. With the surface pressure set to 20 mN/m, the LB membrane was formed and stacked on the glass substrate in 39 layers by the vertical dipping method to form the ultrathin polymeric membrane on the substrate. The surface pressure, the number of layers and the membrane thickness are shown in Table 1-2.

EXAMPLES 1-7 TO 1-10

Using poly(cyclohexyl crotonate) (Example 1-7), poly(sec-butyl crotonate) (Example 1-8) poly(2-chloroisopropyl crotonate) (Example 1-9) and poly(adamantyl crotonate) (Example 1-10) in place of PiPCa of Example 1-6, LB membranes were formed under constant surface pressure and under the conditions shown in Table 1-2, similarly to Example 1-6, and stacked on glass substrates by the vertical dipping method to form ultrathin polymeric membranes. The surface pressure, number of layers and membrane thickness are shown in Table 1-2.

EXAMPLE 1-11

Similarly to Example 1-6, an LB membrane of PiPCA was formed and an ultrathin polymeric membrane was prepared by stacking on a glass substrate by the horizontal lifting method. The surface pressure, number of layers and membrane thickness are shown in Table 1-2.

TABLE 1-2

| Ex. | Surface Pressure (mN/m) | Number of Layers | Membrane Thickness (Å) |
|---|---|---|---|
| 1-6 | 20 | 39 | 420 |
| 1-7 | 15 | 25 | 240 |
| 1-8 | 10 | 35 | 360 |
| 1-9 | 15 | 15 | 150 |
| 1-10 | 15 | 21 | 220 |
| 1-11 | 20 | 5 | 50 |

EXAMPLE 2-1

Figure 3:
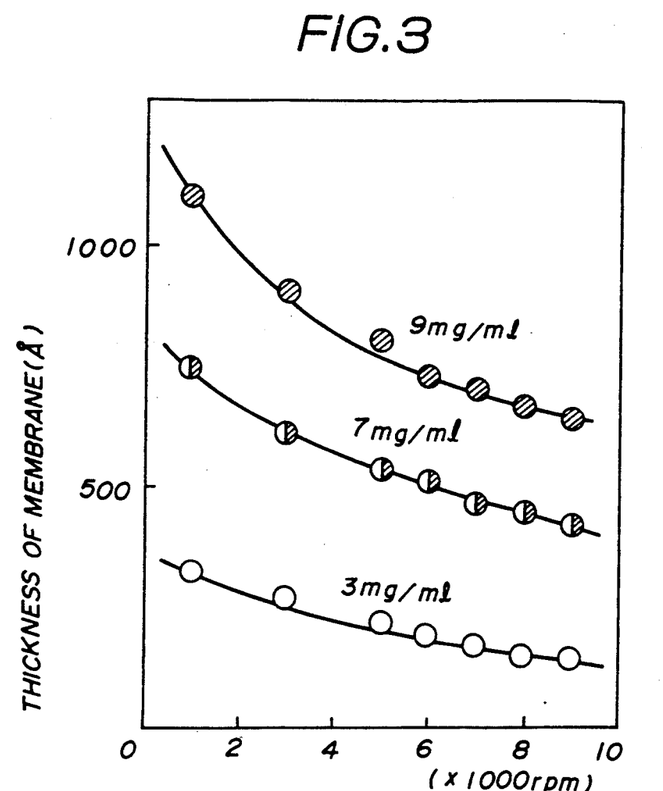
FIG. 3 shows the relation between the number of revolutions of the spin coater in Example 2-1 and the membrane thickness of the ultrathin membrane of poly(tert-butyl methacrylate).

1 ml of a solution in chloroform of poly(tert-butyl methacrylate), hereinafter referred to as PtBMA, of various concentrations, was applied dropwise on a 2.5×5 cm² size glass substrate, and an ultrathin membrane was prepared by spin coating for a time period of rotation of 80 seconds. The membrane thickness was found by a tracer method (Sloan Dec-Tac 11A). The relation between the membrane thickness and the number of revolutions is shown in FIG. 3.

EXAMPLES 2-2 TO 2-5

Using poly(isopropyl methacrylate) (Example 2-2), poly(cyclcohexyl methacrylate), (Example 2-3), poly(-hexafluoroisopropyl methacrylate) (Example 2-4) and poly(chloroisopropyl methacrylate) (Example 2-5) in place of PtBMA of Example 2-1, ultrathin membranes were prepared on glass substrates under the conditions shown in Table 2-1. The relation between the conditions for preparing the ultrathin membranes and the membrane thickness is shown in Table 2-1.

TABLE 2-1

| Ex. | Solvents for Polymer | Polymer Conc. (mg/ml) | Number of Revolution (rpm) | Membrane Thickness (Å) |
|---|---|---|---|---|
| 2-2 | Chloroform | 1.5 | 5000 | 150 |
| 2-3 | Chloroform | 2.5 | 3500 | 250 |
| 2-4 | 3S* | 2.0 | 4500 | 200 |
| 2-5 | 3S* | 1.5 | 4500 | 210 |

3S* 1,1,2-trichloro-1,2,2-trifluoroethane

EXAMPLE 2-6

Figure 4:
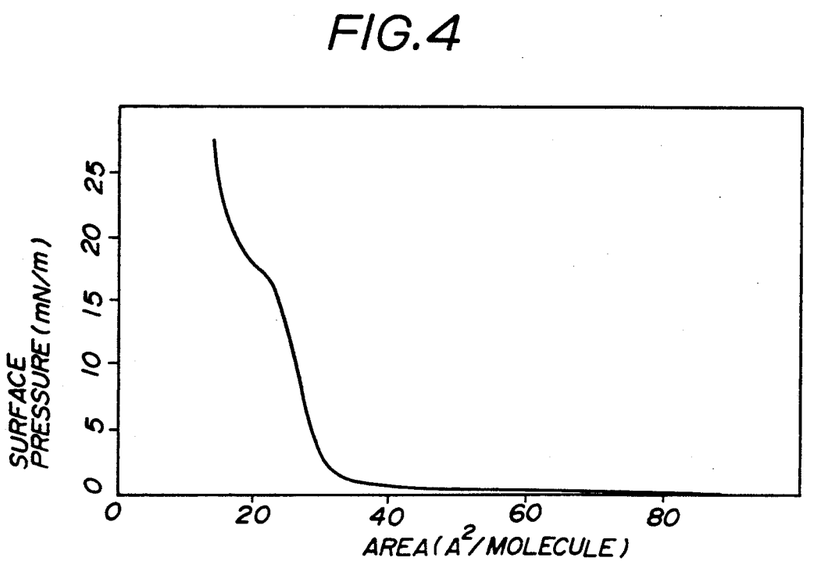
FIG. 4 shows a surface pressure-area curve at 20° C. of poly(isopropyl methacrylate) obtained in Example 2-6.

A Teflon tough having an inside dimension of 15×50 cm² and a depth of 2 cm was filled with pure water and the room temperature was set to 20° C. 50 μl of a solution in chloroform of poly(isopropyl methacrylate), abbreviated hereinafter to PiPMA, with a concentration of 0.5 mg/ml, was applied quietly onto the water surface, and the solvent was vaporized off. While the surface pressure was detected continuously, a Teflon barrier, 20 cm long, placed on the trough, was moved by translational movement at a speed of 5 mm/min to reduce the area to find the relation between the surface pressure and the area occupied by the repeating units (FA curve). FIG. 4 shows the FA curve of PiPMA. It can be seen from this curve that the surface pressure of 5 to 20 mN/m showing an acute rise is suited for stacking LB membranes. With the surface pressure set to 15 mN/m, the LB membrane was formed and stacked on the glass substrate in 49 layers by the vertical dipping method to form the ultrathin polymeric membrane on the substrate. The surface pressure, the number of layers and the membrane thickness are shown in Table 2-2.

EXAMPLES 2-7 TO 2-10

Using poly(tert-butyl methacrylate), (Example 2-7), poly(cyclohexyl methacrylate) (Example 2-8), poly(-chloroprene methacrylate) (Example 2-9) and poly(hexafluoroisopropyl methacrylate) (Example 2-10) in place of PiPMA of Example 2-6, LB membranes were formed under the constant surface pressure and under the conditions shown in Table 2-2, similarly to Example 2-6, and stacked on the glass substrates by the vertical dipping method to form the ultrathin polymeric membranes. The surface pressure, the number of layers and the membrane thicknesses are shown in Table 2-2.

EXAMPLE 2-11

Similarly to Example 2-6, an LB membrane of PiPMA was formed and stacked on the glass substrate by the horizontal lifting method to produce an ultrathin polymeric membrane. The surface pressure, number of layers and membrane thickness are shown in Table 2-2.

TABLE 2-2

| Ex. | Surface Pressure (mN/m) | Number of Layers | Membrane Thickness (Å) |
|---|---|---|---|
| 2-6 | 25 | 49 | 510 |
| 2-7 | 12 | 15 | 130 |
| 2-8 | 5 | 21 | 200 |
| 2-9 | 13 | 12 | 130 |
| 2-10 | 10 | 25 | 270 |
| 2-11 | 15 | 7 | 65 |

EXAMPLE 3-1

On a glass substrate having a 25×25 mm² size electrically conductive indium oxide membrane and rotating at 2,500 rpm by a spinner, 1 ml of a solution in chloroform of PiPCA with a concentration of 1 mg/ml was applied by spin coating. Chloroform was vaporized sufficiently after continued rotation for one minute to form a thin PiPCA membrane of a thickness of 230 Å. The conditions for preparing the thin membrane and the membrane thickness are shown in Table 3-1. Then, using a rubbing device, the produced thin membrane was rubbed ten times with cotton cloth in a predetermined direction for orientation of the substrate to produce a substrate having liquid crystal orientation characteristics.

Figure 5:
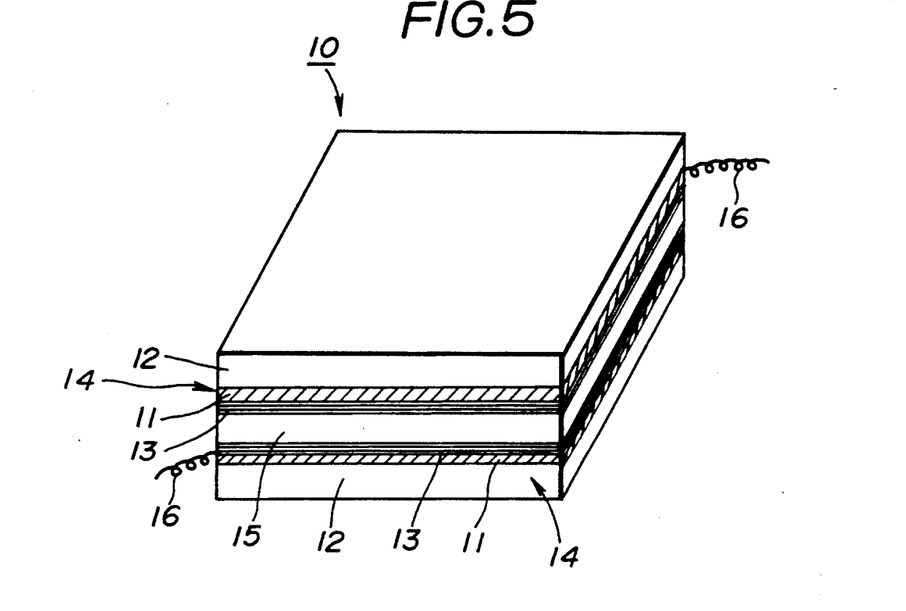
FIG. 5 is a perspective view of a liquid crystal cell prepared in Example 3-1.

A liquid crystal cell 10 was then prepared using two of the so-produced substrates exhibiting the liquid crystal orientation characteristics, as shown in FIG. 5. More specifically, an ITO membrane 11 was applied on a glass substrate 12 and the thin membrane 13 was stacked on the surface of the ITO membrane 11 to form a liquid crystal orientation membrane substrate 14. Two of the membrane substrates 14 were superimposed one on the other, with a liquid crystal layer 15, that is, 4'-(4-cyanobiphenyl)4-(4'-heptylbiphenyl) carboyxlate, therebetween so that the direction of orientation of the thin membranes are at right angles to each other. In this manner, the liquid crystal cell 10 exhibiting twist-nematic orientation is produced. An electrode 16 was affixed to the liquid crystal cell 10 and electrical response characteristics of the liquid crystal cell 10 were checked by visual observation by a polarizing plate or by applying an electrical voltage to the liquid crystal cell 10. As a result, it has become apparent that the liquid crystal display cell prepared by using such substrates 14 in which the liquid crystal was oriented sufficiently and which had the orientation membrane of the PiPCA showed superior electrical response characteristics. The conditions and the membrane thickness are shown in Table 3-1.

EXAMPLE 3-2

A liquid crystal orientation membrane substrate provided with a spin-coated PtBCA membrane with a membrane thickness of 280 Å was prepared in the same way as in Example 3-1, except using a 1 mg/ml solution of PtBCA in chloroform in place of the PiPCA solution of Example 3-1. The conditions of preparing the thin membrane and the membrane thickness are shown in Table 3-1. Using two of the produced membrane substrates exhibiting liquid crystal orientation, a liquid crystal cell 10 was prepared similarly to Example 3-1 and checked in terms of electrical response and orientation characteristics of the liquid crystal. As a result, it has become apparent that the liquid crystal exhibited satisfactory orientation characteristics for the liquid crystal and satisfactory response characteristics against electrical stimuli.

EXAMPLES 3-3 TO 3-10

Using poly(cyclohexyl crotonate) (Example 3-3), poly(sec-butyl crotonate) (Example 3-4), poly(4-methyl-2-pentyl crotonate) (Example 3-5), poly(perfluorooctylethyl crotonate) (Example 3-6), poly(hexafluoroisopropyl crotonate) (Example 3-7), poly(2-chloroisopropyl crotonate) (Example 3-8), poly(1-butoxy-2-propyl crotonate) (Example 3-9) and poly(adamantyl crotonate) (Example 3-10) in place of PiPCA of Example 3-1, several liquid crystal orientation membrane substrates 14 were prepared similarly to Example 3-1 and liquid crystal cells 10 were prepared to check electrical response characteristics and orientation of the liquid crystal. As a result, it has been shown that the liquid crystal cells showed satisfactory liquid crystal orientation and satisfactory electric response characteristics. The conditions and the membrane thickness are shown in Table 3-1.

TABLE 3-1

| Ex. | Solvents for Polymer | Polymer Conc. (mg/ml) | Number of Revolution (rpm) | Membrane Thickness (Å) |
|---|---|---|---|---|
| 3-1 | Chloroform | 1.0 | 2500 | 230 |
| 3-2 | " | 1.0 | 2500 | 280 |
| 3-3 | " | 1.0 | 3000 | 220 |
| 3-4 | Methylene Chloride | 1.5 | 3500 | 200 |
| 3-5 | " | 1.0 | 2500 | 270 |
| 3-6 | 3S* | 1.0 | 2000 | 240 |
| 3-7 | " | 1.2 | 3000 | 280 |
| 3-8 | Methylene Chloride | 1.5 | 3500 | 250 |
| 3-9 | Chloroform | 1.3 | 3000 | 240 |
| 3-10 | " | 1.5 | 3500 | 250 |

3S* 1,1,2-trichloro-1,2,2-trifluoroethane

EXAMPLE 3-11

A Teflon trough with an inside area of 15×50 cm² and a depth of 2 cm was filled with pure water and the room temperature was set to 20° C. 50 μl of a solution in chloroform of PiPCA with a concentration of 0.5 mg/ml were dripped quietly on the water surface and the solvent was vaporized off. While the surface pressure was detected, a Teflon barrier 20 cm long placed on the trough was moved by translational movement at a rate of 5 m/min to reduce the area to find the relation between the surface pressure and the area occupied by the repeating units (FA curve). It has been shown from the curve that the surface pressure of 5 to 30 mN/m exhibiting acute rise was most suitable for stacking the LB membrane. Thus, with the surface pressure set to 20 mN/m, an LB membrane was prepared and stacked on the ITO glass substrate in five layers by the vertical dipping method to form a polymer orientation membrane on the substrate.

Two of the so-produced liquid crystal orientation substrates were used to form a liquid crystal cell. That is, referring to FIG. 5, the liquid crystal cell was prepared in the same way as in Example 3-1, except using the aforementioned LB membrane in place of the ultra-thin membranes 13. After the electrode was affixed to the cell, electrical response characteristics of the cell were checked under application of an electrical voltage or by visual observation using a polarizing plate. As a result, it has been shown that the liquid crystal display cell prepared by using substrates having the orientation membranes of the PiPCA produced as described above exhibited superior electrical response characteristics. The conditions and the membrane thickness are shown in Table 3-2.

EXAMPLE 3-12

The procedure of the Example 3-11 was followed except that a solution in chloroform of PtBCA with a concentration of 0.5 mg/ml was used in place of PiPCA of Example 3-11 to produce liquid crystal orientation membrane substrates with five stacked layers of the LB membranes of PtBCA (surface pressure, 15 mN/m). A liquid crystal cell was prepared using these membrane substrates to check electrical response characteristics and orientation characteristics of the liquid crystal cell. As a result, it has been found that the liquid crystal exhibited satisfactory orientation and electrical response characteristics. The conditions and the membrane thickness are shown in Table 3-2.

EXAMPLES 3-13 TO 3-20

Using poly(cyclohexyl crotonate) (Example 3-13), poly(sec-butyl crotonate) (Example 3-14), poly(4-methyl-2-pentyl crotonate) (Example 3-15), poly(perfluorooctylethyl crotonate) (Example 3-16), poly(hexafluoroisopropyl crotonate) (Example 3-17), poly(2-chloroisopropyl crotonate) (Example 3-18), poly(1-butoxy-2-propyl crotonate) (Example 3-19) and poly(adamantyl crotonate) (Example 3-20) in place of PiPCA of Example 3-11, samples of liquid crystal orientation membrane substrates were prepared similarly to Example 3-11 and liquid crystal cells were prepared to check electrical response and orientation characteristics of the liquid crystal. As a result, it has been shown that the liquid crystal cells showed satisfactory liquid crystal orientation and satisfactory electric response characteristics. The conditions and the membrane thicknesses are shown in Table 3-2.

TABLE 3-2

| Ex. | Surface Pressure (mN/m) | Number of Layers | Membrane Thickness (Å) |
| --- | --- | --- | --- |
| 3-11 | 20 | 5 | 47 |
| 3-12 | 15 | 5 | 50 |
| 3-13 | 10 | 6 | 62 |
| 3-14 | 15 | 7 | 68 |
| 3-15 | 15 | 7 | 73 |
| 3-16 | 12 | 6 | 65 |
| 3-17 | 15 | 5 | 55 |
| 3-18 | 15 | 6 | 64 |
| 3-19 | 18 | 7 | 75 |
| 3-20 | 20 | 5 | 45 |

EXAMPLE 4-1

1 ml of a solution in chloroform of PiPMA (1.5 ml/l) was spin coated on a 25×25 mm² size electrically conductive indium oxide glass substrate at a rate of 3,000 revolutions per minute by a spinner. After rotation was continued for one minute, chloroform was vaporized off sufficiently to form a thin membrane of PiPMA with a membrane thickness of 250 Å. The conditions of preparing the membrane and the membrane thickness are shown in Table 4-1. Then, using a rubbing device, the so-produced membrane was rubbed with cotton cloth ten times in a predetermined direction for orientation treatment to produce a substrate having liquid crystal orientation characteristics.

Using two of such liquid crystal orientation substrates, a liquid crystal cell 10 as shown in FIG. 5 was prepared in the same way as in Example 3-1. As a result, it has been shown that the liquid crystal was oriented sufficiently and that the liquid crystal display device prepared by using the substrates having PiPMA orientation membranes exhibited superior electrical response characteristics. The conditions and the membrane thickness are shown in Table 4-1.

EXAMPLE 4-2

The procedure of Example 4-1 was followed except using a solution in chloroform of PtBMA with the concentration of 2.0 mg/ml in place of PiPMA of Example 4-1 to produce a liquid crystal cell having spin coated membranes of PtBMA thereon with membrane thickness of 300 Å. The conditions of preparation and membrane thickness are shown in Table 4-1. Similarly to Example 4-1, the orientation and electrical response characteristics of the liquid crystal in the liquid crystal cell were checked. As a result, it has been shown that the liquid crystal exhibited satisfactory orientation and response characteristics against electrical stimuli.

Examples 4-3 to 4-8

Using poly(cyclohexyl methacrylate) (Example 4-3), poly(4-methyl-2-pentyl methacrylate) (Example 4-4), poly(perfluorooctylethyl methacrylate) (Example 4-5), poly(hexafluoroisopropyl methacrylate) (Example 4-6), poly(2-chloroisopropyl methacrylate) (Example 4-7) and poly(3-tris(trimethylsiloxy)silyl methacrylate) (Example 4-8) in place of PiPMA of Example 4-1, liquid crystal cells were prepared in the same way as in Example 4-1 under the conditions shown in Table 4-1 to check orientation and electrical response characteristics of the liquid crystal cells. As a result, it has been shown that the liquid crystals of the liquid crystal cells exhibited satisfactory orientation and electrical response characteristics. The conditions and the membrane thicknesses are shown in Table 4-1.

TABLE 4-1

| Ex. | Solvents for Polymer | Polymer Conc. (mg/ml) | Number of Revolution (rpm) | Membrane Thickness (Å) |
| --- | --- | --- | --- | --- |
| 4-1 | Chloroform | 1.5 | 3000 | 250 |
| 4-2 | " | 2.0 | 2000 | 300 |
| 4-3 | " | 1.0 | 3000 | 200 |
| 4-4 | Methylene Chloride | 2.0 | 3000 | 260 |
| 4-5 | 3S* | 1.5 | 3000 | 250 |
| 4-6 | " | 1.0 | 4000 | 180 |
| 4-7 | Methylene Chloride | 1.6 | 3500 | 250 |
| 4-8 | Chloroform | 1.5 | 3500 | 220 |

3S* 1,1,2-trichloro-1,2,2-trifluoroethane

EXAMPLE 4-9

A Teflon trough with an inside area of 15×50 cm² and a depth of 2 cm was filled with pure water and the room temperature was set to 20° C. 200 μl of a solution in chloroform of PiPMA with a concentration of 0.3 mg/ml was dripped quietly on the water surface and the solvent was vaporized off. While the surface pressure was detected continuously, a Teflon barrier 20 cm long placed on a trough was moved by translational movement at a rate of 5 mm/min to reduce the area. With the surface pressure set to 15 mN/m, an LB membrane was formed and stacked in five layers on an ITO glass substrate by the vertical dipping method to form an ultrathin polymeric membrane on the substrate. A liquid crystal cell was prepared in the same way as in Example 4-1 to check its electrical response characteristics under application of an electrical voltage and by visual observation using a polarizing plate. As a result, it has been found that the so-produced liquid crystal cell exhibited sufficient liquid crystal orientation and superior electrical response characteristics.

Using PiPMA in the similar manner, LB membranes of PiPMA were also formed on the water surface, while the surface pressure was changed in the range of 5 to 20 mN/m, to form a number of orientation membrane substrates with 5 to 20 stacked layers of the LB membranes. Using these membrane substrates, liquid crystal cells were prepared, in the same way as in Example 4-1. It has been found that, in the so-produced liquid crystal cells, the LB membranes were stacked at the surface pressure of the order of 5 to 20 mN/m, and that sufficient liquid crystal orientation and excellent electrical response properties were achieved with about five stacked layers.

EXAMPLE 4-10

A liquid crystal cell with a five layer stacked LB membrane of PtBMA (surface pressure, 15 mN/m) was prepared in the same way as in Example 4-1, except using a solution in chloroform of PtBMA with a concentration of 0.5 mg/ml in place of the PiPMA solution of Example 4-9, to check electrical response and orientation characteristics of the liquid crystal cell. As a result, it has been found that the liquid crystal exhibited satisfactory orientation and electrical response characteristics.

EXAMPLE 4-11 TO 4-16

Using poly(cyclohexyl methacrylate) (Example 4-11), poly(4-methyl-2-pentyl methacrylate) (Example 4-12), poly(perfluorooctylethyl methacrylate) (Example 4-13), poly(hexafluoroisopropyl methacrylate) (Example 4-14), poly(2-chloroisopropyl methacylate) (Example 4-15) and poly(3-tris(trimethylsiloxy)silyl methacrylate) (Example 4-16) in place of PiPMA of Example 4-9, liquid crystal orientation membrane substrates were prepared in the same way as in Example 4-9 under the conditions shown in Table 4-2 to produce liquid crystal cells to check orientation and electrical response characteristics of the cells. As a result, it has been found that the liquid crystal cells exhibited satisfactory orientation and electrical response characteristics of the liquid cells.

TABLE 4-2

| Ex. | Surface Pressure (mN/m) | Number of Layers | Membrane Thickness (Å) |
| --- | --- | --- | --- |
| 4-9 | 15 | 5 | 50 |
| 4-10 | 13 | 6 | 58 |
| 4-11 | 10 | 7 | 65 |
| 4-12 | 5 | 7 | 73 |
| 4-13 | 10 | 8 | 85 |
| 4-14 | 13 | 7 | 75 |
| 4-15 | 12 | 6 | 65 |
| 4-16 | 16 | 9 | 105 |

EXAMPLE 5-1

Figure 6:
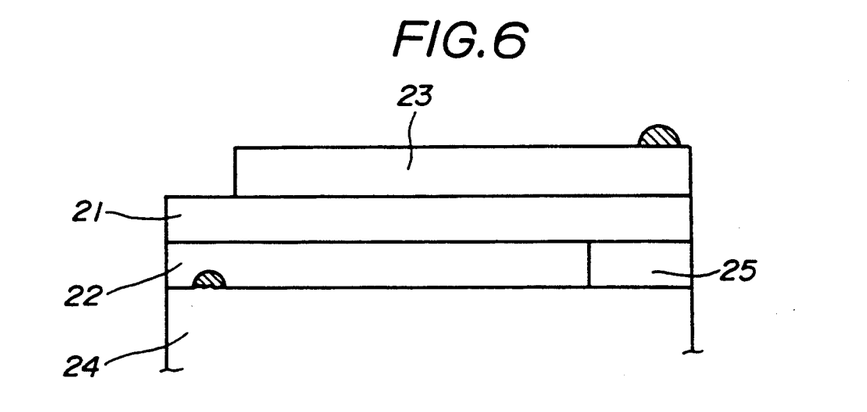
FIG. 6 is a diagrammatic view showing an MIM device prepared in Example 5-1.
Figure 7:
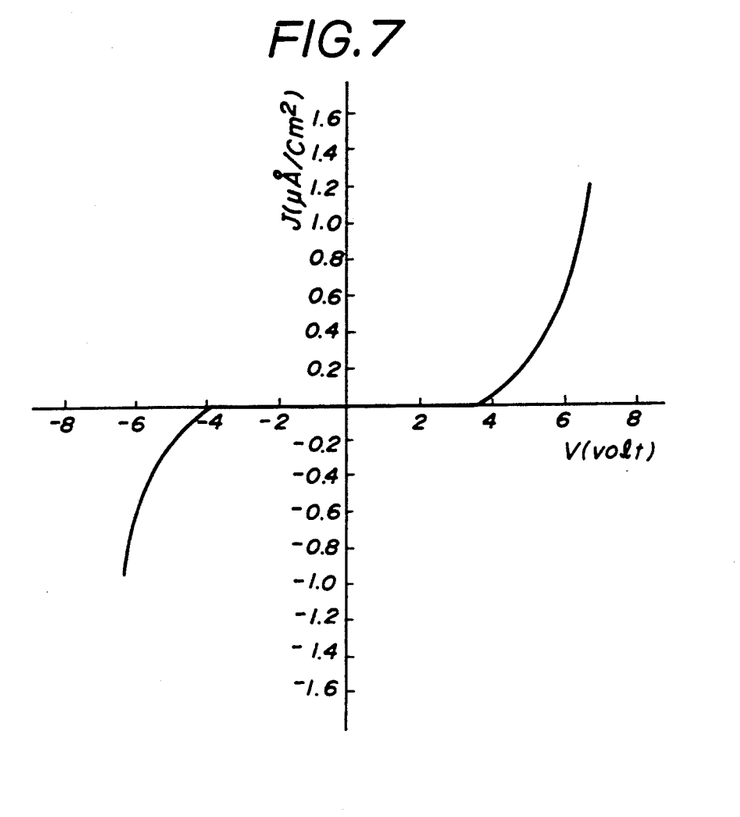
FIG. 7 shows current-voltage characteristics of the MIM device prepared in Example 5-1.

A transparent electrode substrate 22 of ITO having a thickness of 2000 Å (indium tin oxide) with a current density of 10 ohms/cm$^2$ was formed on a glass substrate 24. On the transparent substrate 22 was applied a solution in chloroform of PiPCA with a concentration of 2 mg/ml by spin coating at 5,500 rpm to form a coating layer 25 and a thin membrane 21 which was 110 Å thick. An electrode 23 was then applied by aluminum evaporation to form an MIM type device (ITO/PiPCA/Al). The so-produced MIM type device was placed in situ in vacuo (10$^{-8}$ torr) to measure current-voltage (J-V) characteristics. The MIM type device is shown diagrammatically in FIG. 6, while the J-V characteristics are shown in FIG. 7 and the conditions and the membrane thickness are shown in Table 5-1.

EXAMPLES 5-2 TO 5-5

Using poly(cyclohexyl crotonate) (Example 5-2), poly(sec-butyl crotonate) (Example 5-3), poly(hexafluoroisopropyl crotonate) (Example 5-4) and poly(adamantyl crotonate) (Example 5-5) in place of PiPCA of Example 5-1, the corresponding chloroform solutions were applied on the glass substrates having transparent electrodes by spin coating under the conditions shown in Table 5-1, and upper electrodes were affixed to form the MIM type devices. The J-V characteristics were then measured, and the results similar to those of Example 5-1 were obtained. The conditions and the membrane thicknesses are shown in Table 5-1.

TABLE 5-1

| EX. | Solvents for Polymer | Polymer Conc. (mg/ml) | Number of Revolution (rpm) | Membrane Thickness (Å) | Substrate | Counter Electrode |
| --- | --- | --- | --- | --- | --- | --- |
| 5-1 | Chloroform | 2.0 | 5500 | 110 | ITO | Al |
| 5-2 | Chloroform | 2.5 | 4500 | 200 | NESA | Au |
| 5-3 | Chloroform | 1.5 | 3500 | 150 | ITO | Au |
| 5-4 | 3S* | 2.0 | 4000 | 120 | ITO | Al |
| 5-5 | Methylene Chloride | 2.5 | 5000 | 150 | NESA | Al |

3S* 1,1,2-trichloro-1,2,2-trifluoroethane

EXAMPLE 5-6

Figure 8:
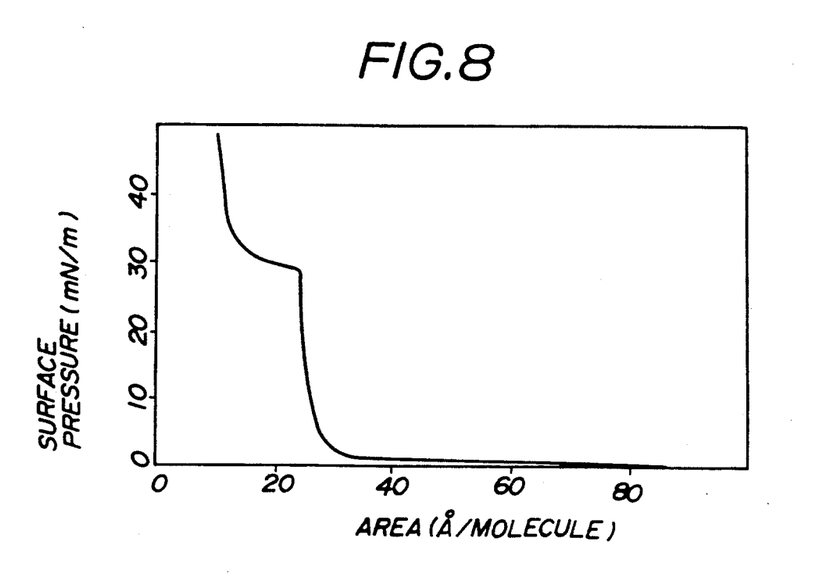
FIG. 8 shows a surface pressure-area (FA) curve of poly(tert-butyl crotonate) obtained in Example 5-6.
Figure 9:
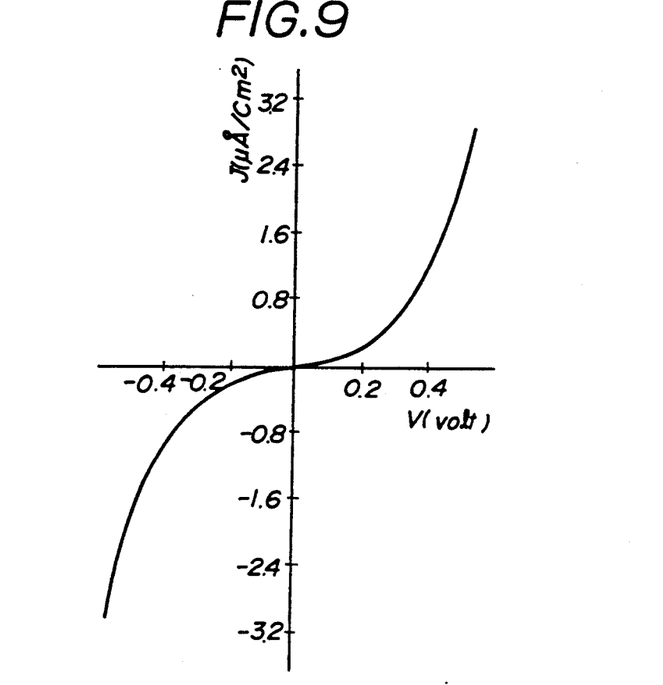
FIG. 9 shows current-voltage (J-V) characteristics of the MIM device prepared in Example 5-6.

A Teflon trough having an inner area of 15×50 cm$^2$ and a depth of 2 cm was filled with pure water and the room temperature was set to 20° C. 50 μl of a solution in chloroform of PtBCA with a concentration of 0.5 mg/ml was dripped quietly on the water surface and the solvent was vaporized off. While the surface pressure was detected continuously, a Teflon barrier 20 cm long placed on the trough was moved by translational movement at a rate of 5 mm/min to reduce the area to find the relation between the surface pressure and the area occupied by the repeating units (FA curve). FIG. 8 shows the FA curve for PtBCA. As may be seen from this figure, the surface pressure of 5 to 30 mN/m showing acute rise of the curve is most suited to stack the LB membrane. With the surface pressure thus set to 20 mN/m, an LB membrane was formed and stacked in nine layers on the glass substrate by the vertical dipping method to form a high polymer insulating layer on the substrate. Gold was then evaporated to form an electrode to form an MIM type device (NESA/PtBCA-LB/Au) and current-voltage (J-V) characteristics thereof were measured in vacuo. The results of measurement are shown in FIG. 9 and the conditions as well as the membrane thickness are shown in Table 5-2.

EXAMPLES 5-7 TO 5-10

Using poly(cyclohexyl crotonate) (Example 5-7), poly(sec-butyl crotonate) (Example 5-8), poly(2-chloroisopropyl crotonate) (Example 5-9) and poly(adamantyl crotonate) (Example 5-10) in place of PtBCA of Example 5-1, each of LB membranes was formed under the conditions shown in Table 5-2 in the same way as in Example 5-6 and stacked on a glass substrate provided with a transparent electrode by the vertical dipping method to form the polymer insulating membranes. An upper electrode was then affixed and the J-V characteristics were measured. As a result, characteristics similar to those shown in FIG. 9 were obtained. The conditions and the membrane thicknesses are shown in Table 5-2.

TABLE 5-2

| Ex. | Surface Pressure (mN/m) | Number of Layers | Membrane Thickness (Å) | Substrate | Counter Electrode |
|---|---|---|---|---|---|
| 5-6 | 20 | 9 | 100 | NESA | Al |
| 5-7 | 15 | 15 | 140 | ITO | Al |
| 5-8 | 10 | 20 | 210 | ITO | Au |
| 5-9 | 15 | 15 | 150 | NESA | Al |
| 5-10 | 15 | 21 | 220 | ITO | Al |

EXAMPLE 6-1

Figure 10:
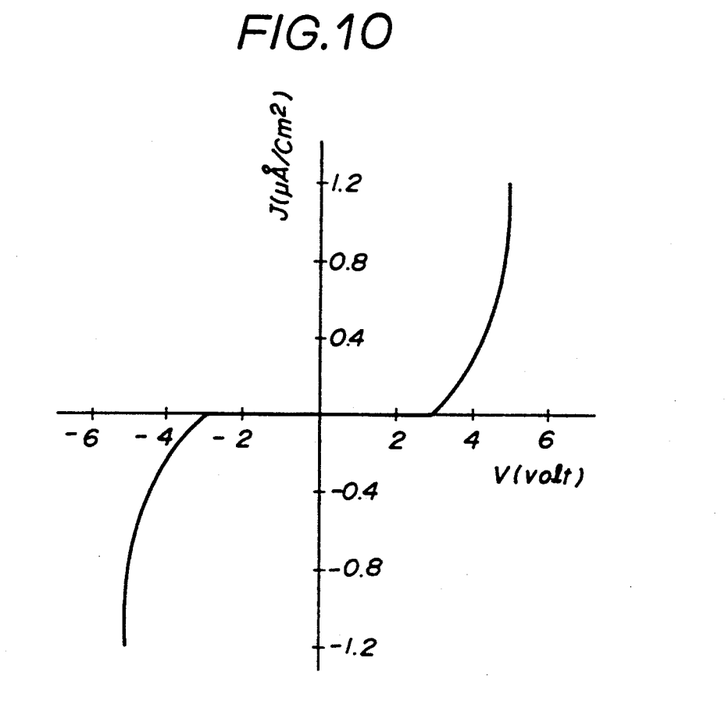
FIG. 10 shows current-voltage characteristics of the MIM device prepared in Example 6-1.

The procedure of Example 5-1 was followed except using PiPMA as polymethacrylate to produce an MIM type device (ITO/PiPMA/Al). The so-produced MIM type device was placed in situ in vacuo to measure current-voltage (J-V) characteristics. FIG. 10 shows the J-V characteristics and Table 6-1 shows the conditions and the membrane thickness.

EXAMPLES 6-2 TO 6-5

Using poly(tert-butyl methacrylate) (Example 6-2), poly(cyclohexyl methacrylate) (Example 6-3), poly(-hexafluoroisopropyl methacrylate) (Example 6-4) and poly(chloroisopropyl methacrylate) (Example 6-5) in place of PiPMA of Example 6-1, the corresponding chloroform solutions were applied on the glass substrates having transparent electrodes by spin coating under the conditions shown in Table 6-1, and upper electrodes were affixed to form the MIM type devices. The J-V characteristics were then measured, and the results similar to those of Example 6-1 were obtained. The conditions and the membrane thicknesses are shown in Table 6-1.

TABLE 6-1

| EX. | Solvents for Polymer | Polymer Conc. (mg/ml) | Number of Revolution (rpm) | Membrane Thickness (Å) | Substrate | Counter Electrode |
|---|---|---|---|---|---|---|
| 6-1 | Chloroform | 2.0 | 5500 | 250 | ITO | Al |
| 6-2 | Chloroform | 2.0 | 5500 | 180 | NESA | Au |
| 6-3 | Chloroform | 1.8 | 4000 | 140 | ITO | Au |
| 6-4 | 3S* | 2.5 | 3500 | 450 | ITO | Al |
| 6-5 | Methylene Chloride | 1.5 | 4000 | 230 | NESA | Al |

3S* 1,1,2-trichloro-1,2,2-trifluoroethane

EXAMPLE 6-6

Figure 11:
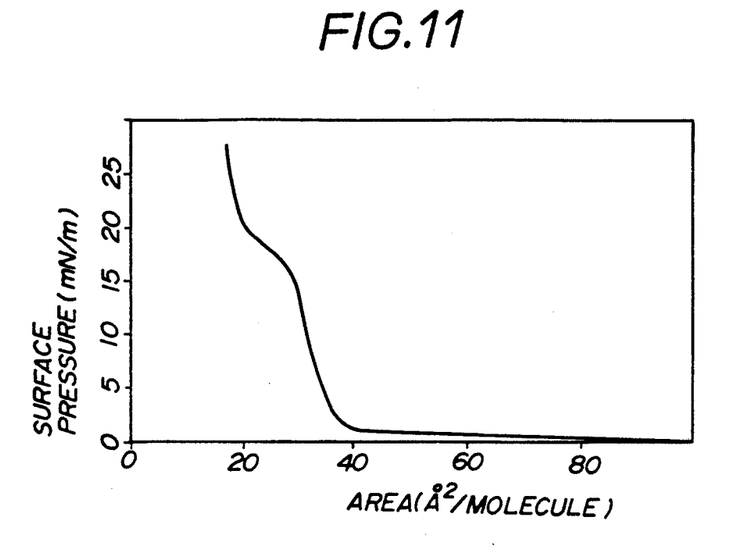
FIG. 11 shows a surface pressure-area (FA) curve of poly(tert-butyl methacrylate) employed in Example 6-6.
Figure 12:
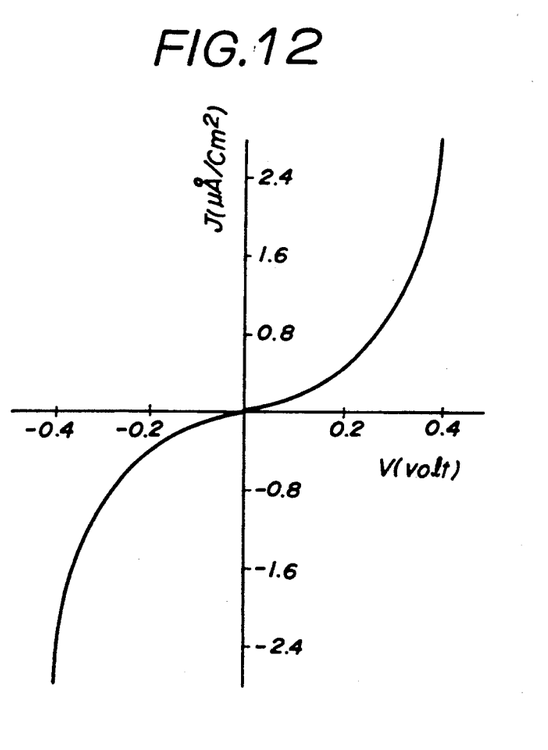
FIG. 12 shows current-voltage(J-V) characteristics of the MIM device prepared in Example 6-6.

A Teflon trough having an inner area of 15×50 cm² and a depth of 2 cm was filled with pure water and the room temperature was set to 20° C. 50 μl of a solution in chloroform of PtBMA with a concentration of 0.5 mg/ml was dripped quietly on the water surface and the solvent was vaporized off. While the surface pressure was detected continuously, a Teflon barrier 20 cm long placed on the trough was moved by translational movement at a rate of 5 mm/min to reduce the area to find the relation between the surface pressure and the area occupied by the repeating units (FA curve). FIG. 11 shows the FA curve for PtBMA. As may be seen from this figure, the surface pressure of 5 to 30 mN/m showing acute rise of the curve is most suited for stacking the LB membrane. With the surface pressure thus set to 20 mN/m, an LB membrane was formed and stacked in nine layers on the glass substrate by the vertical dipping method to form a polymer insulating layer on the substrate. Gold was then evaporated to form an electrode to form an MIM type device (NESA/PtBMA-LB/Au) and current-voltage (J-V) characteristics were measured in vacuo. The results of measurement are shown in FIG. 12 and the conditions as well as the membrane thickness are shown in Table 6-2.

EXAMPLES 6-7 TO 6-10

Using PiPMA (Example 6-7), poly(cyclohexyl methacrylate) (Example 6-8), poly(chloroisopropyl methacrylate) (Example 6-9) and poly(hexafluoropropyl methacrylate) (Example 6-10) in place of PiBMA of Example 6-6, LB membranes were formed under the conditions shown in Table 6-2 and stacked on glass substrates provided with transparent electrodes by the vertical dipping method to form polymer insulating membranes. Upper electrodes were then affixed and the J-V characteristics were measured. As a result, characteristics similar to those shown in FIG. 12 were obtained. The conditions and the membrane thicknesses are shown in Table 6-2.

TABLE 6-2

| Ex. | Surface Pressure (mN/m) | Number of Layers | Membrane Thickness (Å) | Substrate | Counter Electrode |
|---|---|---|---|---|---|
| 6-6 | 13 | 7 | 75 | NESA | Al |
| 6-7 | 10 | 21 | 200 | ITO | Al |
| 6-8 | 12 | 15 | 160 | ITO | Au |
| 6-9 | 16 | 5 | 55 | NESA | Al |
| 6-10 | 7 | 11 | 100 | ITO | Al |

Although the present invention has been described with reference to the specific examples, it should be understood that various modifications and variations can be easily made by those skilled in the art without departing from the spirit of the invention. Accordingly, the foregoing disclosure should be interpreted as illustrative only and is not to be interpreted in a limiting sense. The present invention is limited only by the scope of the following claims.

What is claimed is:

1. An ultrathin polymeric membrane having a membrane thickness of 10 to 1,000 Å, the membrane being constituted of polycrotonate and obtained by forming a coating of said polycrotonate by subjecting said polycrotonate to the spin coating method, said polycrotonate comprising recurrent units represented by the formula (I)

wherein R represents a hydrocarbon group selected from the group consisting of a branched alkyl group having 3 to 12 carbon atoms, a cycloalkyl group having 3 to 12 carbon atoms, a substituted alkyl group having 2 to 6 carbon atoms and containing a ring structure having 3 to 14 carbon atoms, a substituted cycloalkyl group having 3 to 10 carbon atoms and containing a ring structure substituent having 3 to 14 carbon atoms and a siloxanic hydrocarbon group containing a ring structure substituent having 3 to 14 carbon atoms with or without each of said hydrocarbon groups containing a hetero atom and being substituted by a halogen atom.

2. An ultrathin polymeric membrane having a membrane thickness of 10 to 1,000 Å, the membrane being constituted of polycrotonate and obtained by forming a coating of said polycrotonate by subjecting said polycrotonate to the Langmuir-Blodgett method, said polycrotonate comprising recurrent units represented by the formula (I)

wherein R represents a hydrocarbon group selected from the group consisting of a branched alkyl group having 3 to 12 carbon atoms, a cycloalkyl group having 3 to 12 carbon atoms, a substituted alkyl group having 2 to 6 carbon atoms and containing a ring structure substituent having 3 to 14 carbon atoms, a substituted cycloalkyl group having 3 to 10 carbon atoms and containing a ring structure substituent having 3 to 14 carbon atoms and a siloxanic hydrocarbon group containing a ring structure substituent having 3 to 14 carbon atoms with or without each of said hydrocarbon groups containing a hetero atom and being substituted by a halogen atom.

3. The ultrathin polymeric membrane according to claim 1 or 2, wherein a monomer constituting said recurrent units of the formula (I) is selected from the group consisting of isopropyl crotonate, tert-butyl crotonate, cyclohexyl crotonate, sec-butyl crotonate, 1-butoxy-2-propyl crotonate, 4-methyl-2-pentyl crotonate, crotonate, 3-tris(trimethylsiloxy) silylpropyl crotonate, 2-cyanoethyl crotonate, glycidyl crotonate, diethylphosphonomethyl crotonate, 2-methylthioethyl crotonate, perfluorooctylethyl crotonate, trifluoromethyl crotonate, pentafluoroethyl crotonate, hexafluoroisopropyl crotonate, 1-chloroisopropyl crotonate and mixtures thereof.

4. The ultrathin polymeric membrane according to claim 1 wherein said recurrent units of the formula (I) comprise recurrent units constituted by a comonomer selected from the group consisting of vinyl acetate, vinyl propionate, vinyl caproate, vinyl benzoate, styrene, α-methylstyrene, chloromethylstyrene, methylvinylether, n-butylether, aliphatic allyl esters, aromatic allyl esters, acrylic esters, methacrylic esters, acrylonitrile, vinyl chloride, vinylidene chloride, ethylene, butadiene, chloroprene, isoprene, isobutylene and mixtures thereof.

5. The ultrathin polymeric membrane according to claim 1 or 2, wherein an average molecular weight of said polycrotonate of the formula (I) is 10,000 to 2,000,000.

6. The ultrathin polymeric membrane according to claim 1 or 2 wherein said polycrotonate of the formula (I) contains not less than 60 mol percent of said recurrent units of carboxylate.

7. A method for preparing the ultrathin polymeric membrane according to claim 1 comprising dissolving the polycrotonate according to claim 1 in a vaporizable organic solvent to produce a solution of the polycrotonate of a concentration of 0.1 to 20 mg/ml and forming a thin membrane from said solution by the spin coating method at 1,000 to 15,000 rpm.

8. The method according to claim 7 wherein said spin coating method is carried out at a temperature of 10° to 35° C.

9. A method for preparing the ultrathin polymeric membrane according to claim 2 comprising dissolving the polycrotonate according to claim 2 in a vaporizable organic solvent to produce a solution of the polycrotonate of a concentration of 0.1 to 10 mg/ml, developing said solution on a water surface, applying a pressure, maintaining the surface pressure at 3 to 30 mN/m for forming a solid membrane and stacking a plurality of said solid membranes.

10. The method according to claim 9 wherein said plurality of said solid membranes are stacked by the vertical dipping method.

11. The method according to claim 9 wherein said plurality of said solid membranes are stacked by the horizontal lifting method.

12. A liquid crystal orientation membrane wherein the ultrathin polymeric membrane of claim 1 or 2 is provided on a substrate.

13. The liquid crystal orientation membrane according to claim 12 wherein said membrane is rubbed in a predetermined direction.

14. The liquid crystal orientation membrane according to claim 12 wherein said substrate is an electrically conductive transparent substrate selected from the group consisting of an indiumtin oxide glass substrate and a tin oxide glass substrate.

15. An electrical device comprising a substrate, an insulating layer including the ultrathin polymeric membrane according to claim 1, and an electrode.

16. An electrical device comprising a substrate, an insulating layer including the ultrathin polymeric membrane according to claim 2, and an electrode.

17. The electrical device according to claim 15 or 16 wherein said electrical device has a structure selected from the group consisting of a metal/insulator/metal structure, a metal/insulator/semiconductor structure and a semiconductor/insulator/semiconductor structure.

* * * * *